United States Patent [19]

Barillari et al.

[11] Patent Number: 5,036,314

[45] Date of Patent: Jul. 30, 1991

[54] METHOD AND SYSTEM FOR THE INTEGRATED SUPPLY OF TELEMATIC SERVICES AND GRAPHIC INFORMATION TO USER TERMINALS, PARTICULARLY FOR ADVERTISING PURPOSES

[75] Inventors: Piero Barillari; Pierluigi DeSanti; Mario Galderesi; Carlo A. Marchi; Franco Natili, all of Rome; Vincenzo Rossiello, Pomezia; Donato Settembre, Rome; Francesco Urbinati, Rome, all of Italy

[73] Assignee: Sarin S.S. Ausiliari e Ricerca Informatica, Pomezia, Italy

[21] Appl. No.: 296,160

[22] Filed: Jan. 12, 1989

[30] Foreign Application Priority Data

Jan. 12, 1988 [IT] Italy .............................. 67013 A/88

[51] Int. Cl.$^5$ ............................................. G09G 5/00
[52] U.S. Cl. .................................. 340/717; 340/735; 340/748
[58] Field of Search .................. 340/717, 825.06, 735, 340/748, 790; 379/100, 111, 112, 96; 364/464.01

[56] References Cited

U.S. PATENT DOCUMENTS

| | | | |
|---|---|---|---|
| 3,778,811 | 12/1973 | Gicca et al. ......................... | 340/717 |
| 3,781,850 | 12/1973 | Gicca et al. ......................... | 340/717 |
| 3,967,268 | 6/1976 | Roberts ............................... | 340/748 |
| 4,075,620 | 2/1978 | Passavant et al. ................. | 340/717 |
| 4,091,424 | 5/1978 | Widergren . | |
| 4,284,988 | 8/1981 | Seitz et al. . | |
| 4,439,761 | 3/1984 | Fleming et al. ..................... | 340/735 |
| 4,563,677 | 1/1986 | Seiler ................................... | 340/735 |
| 4,672,459 | 6/1987 | Kudo .................................... | 358/452 |
| 4,788,709 | 11/1988 | Matsumoto ......................... | 379/100 |
| 4,825,462 | 4/1989 | Lewiner et al. ..................... | 379/131 |
| 4,829,213 | 5/1989 | Pecile et al. ......................... | 340/825.81 |

FOREIGN PATENT DOCUMENTS 0158548 10/1985 European Pat. Off. .
0222919 5/1987 European Pat. Off. .

OTHER PUBLICATIONS

Mini-Micro Conference Record, May 1984, pp. 8/4 1-6, IEEE, New York, R. Peterson: "Video Display Processors Draw the Line On Expensive Graphic Systems".

Computer Design, vol. 20, No. 7, Jul. 1981, pp. 111-113, Winchester, Mass., D. Jones et al.: "Graphics and Imaging System Offloads Computer".

Primary Examiner—Jeffery A. Brier
Attorney, Agent, or Firm—Sughrue, Mion, Zinn, Macpeak & Seas

[57] ABSTRACT

The user terminals linked to the system are provided with a graphics function capable of generating particular non-elementary image components on the screen of each terminal in dependence on respective input commands. The graphic information is supplied to the user terminals in a manner integrated with the telematic services. The information is supplied after the selection of the preselected command from a command menu, and the formulation, still operating by selection, of the whole requirement, the transmission of which enables the system to produce the graphic advertising insertion associated with the retrieval effected.

The proposed application has been developed for use in the supply of telematic services such as data banks, Electronic Yellow Pages, home banking, electronic mail and the like.

10 Claims, 5 Drawing Sheets

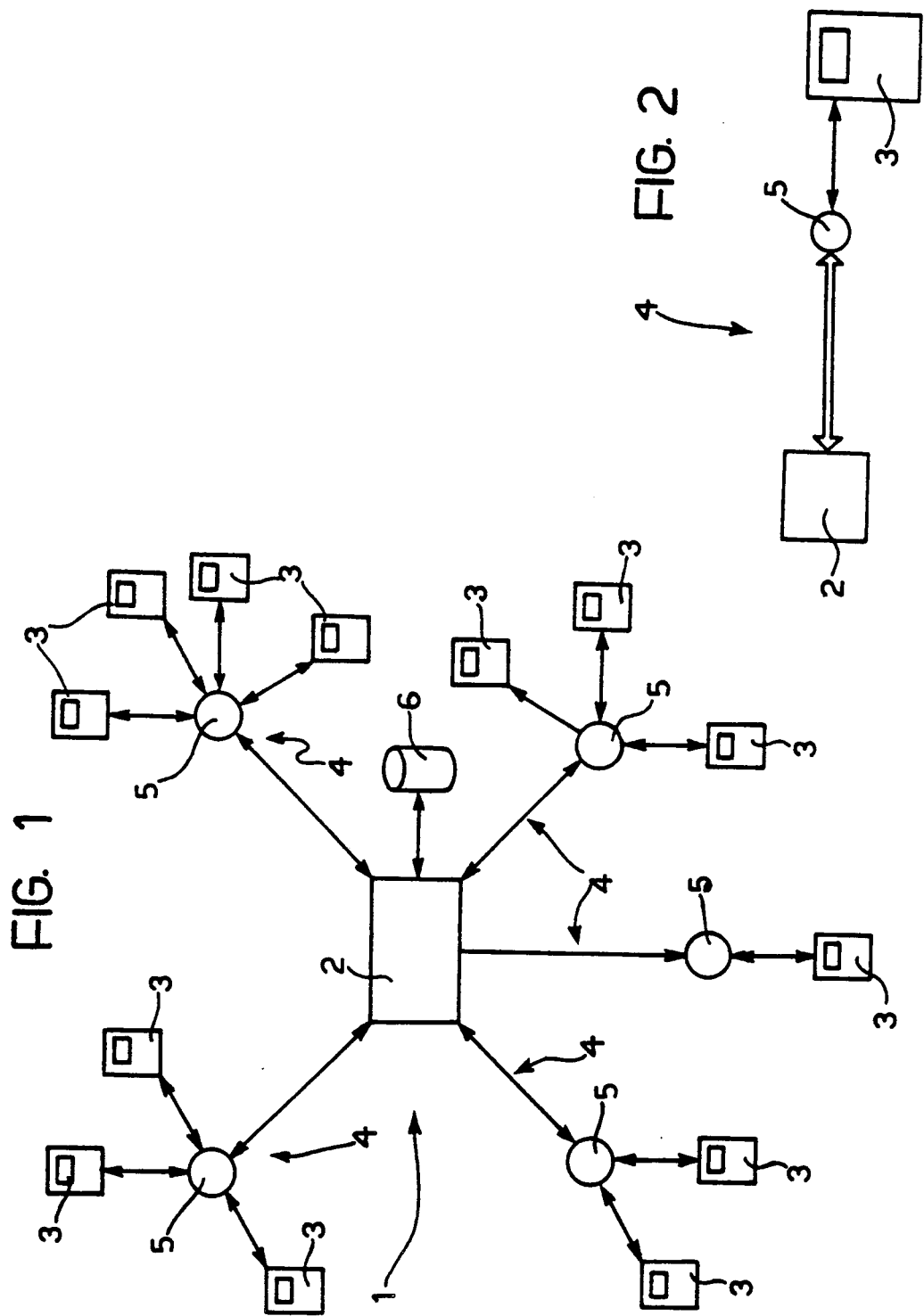

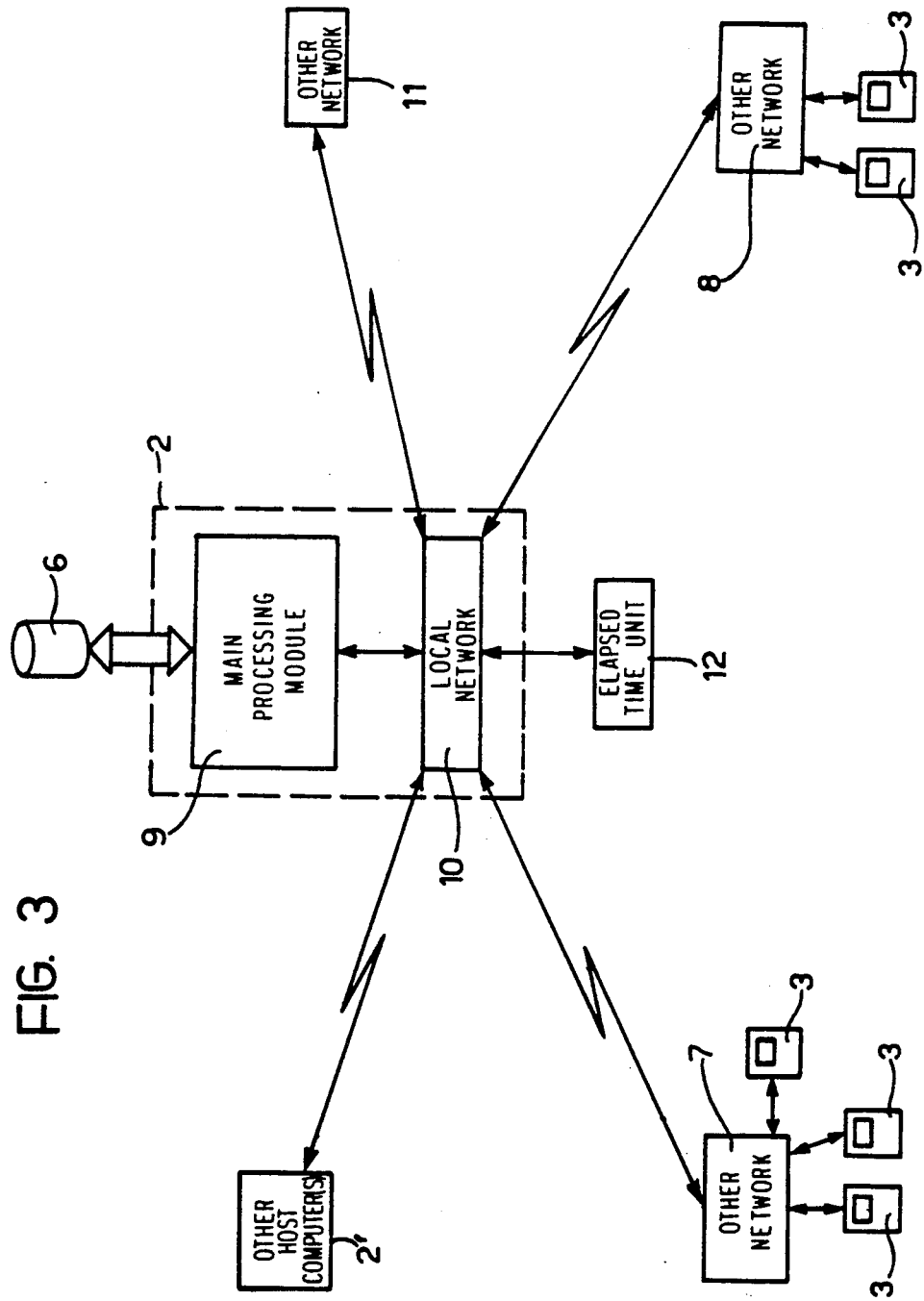

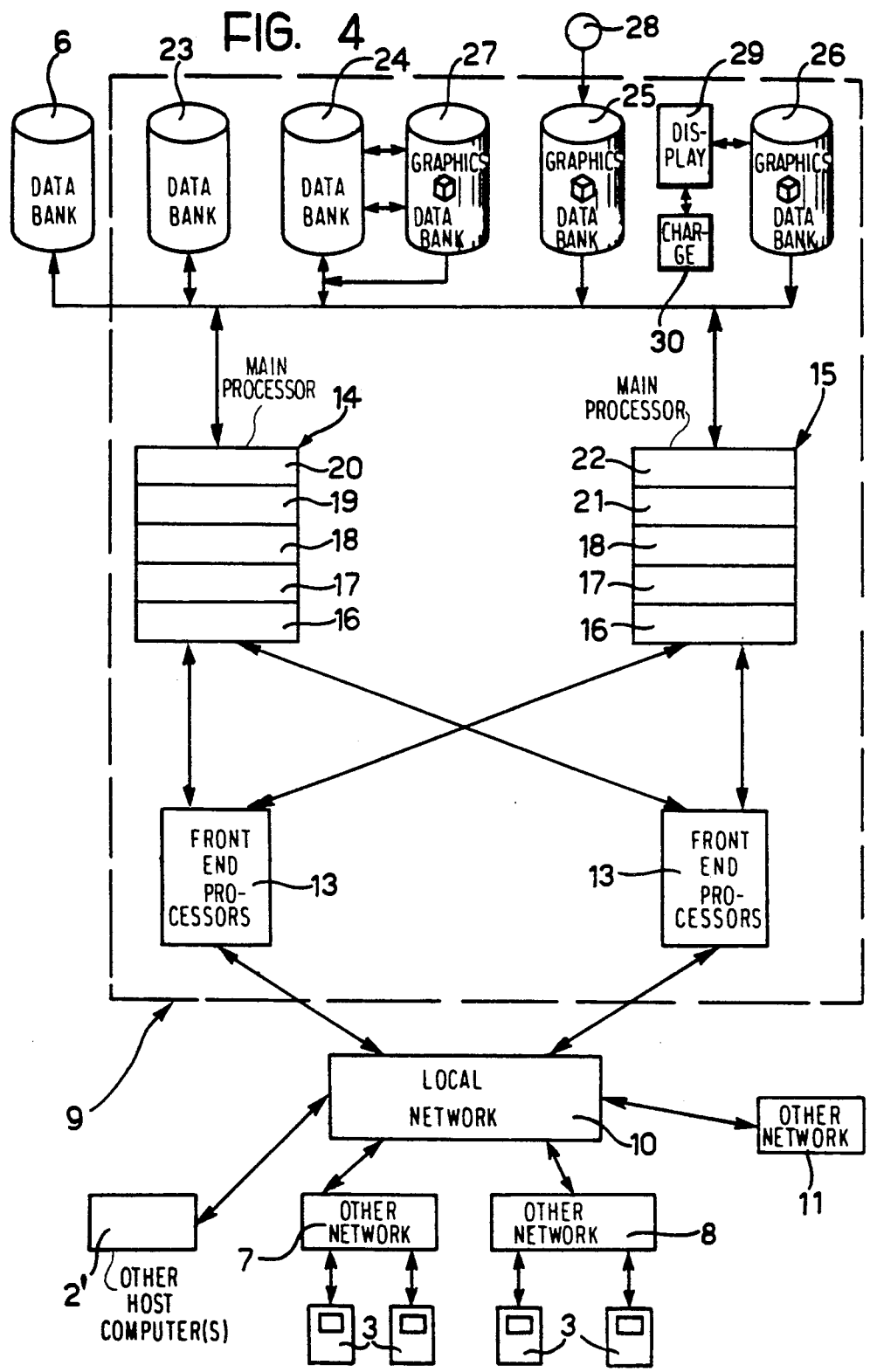

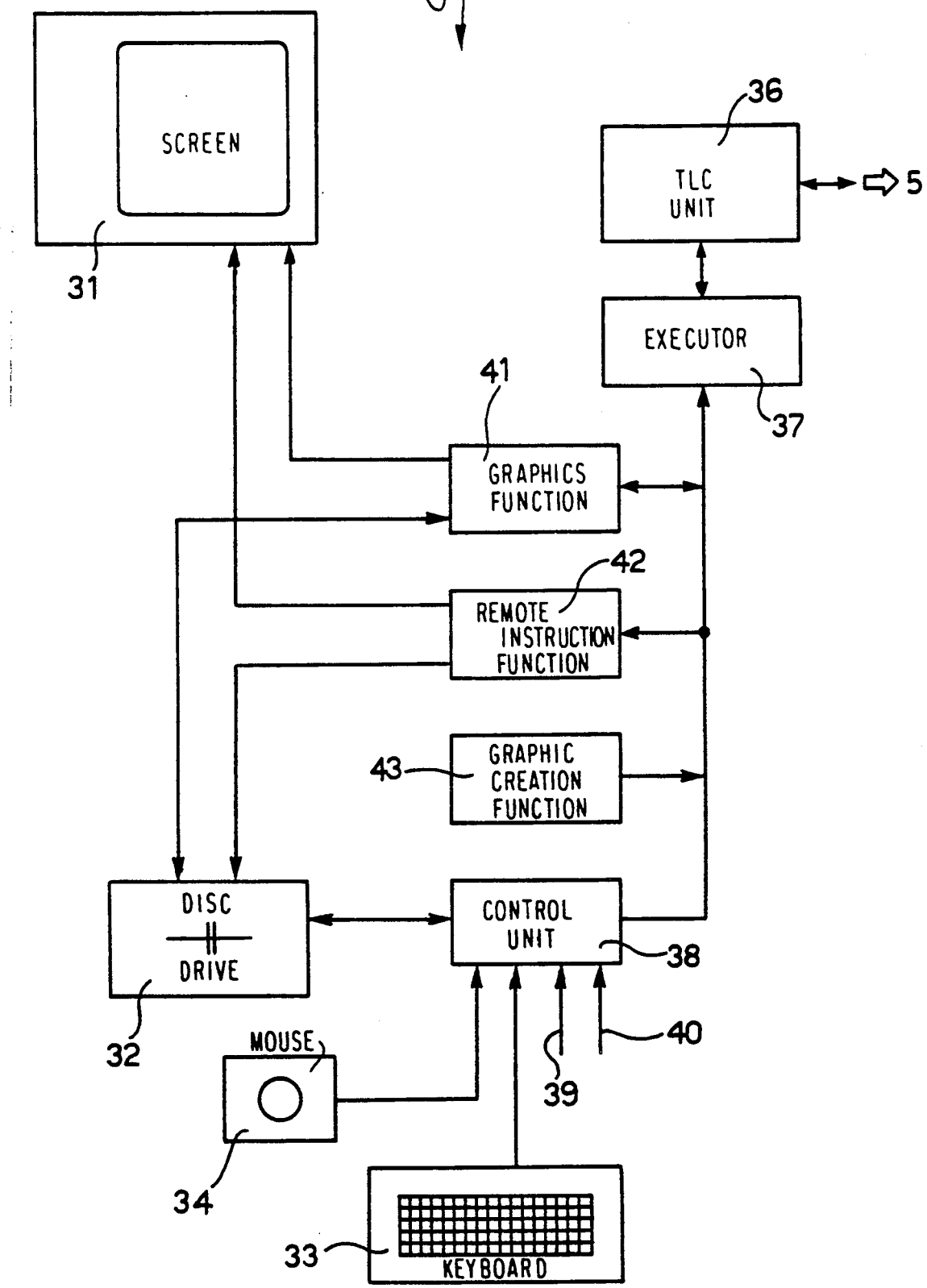

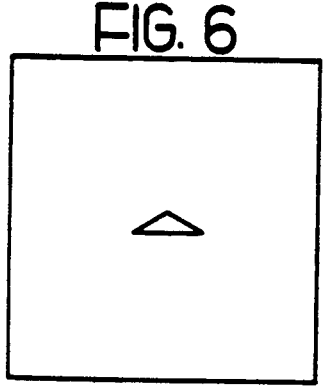
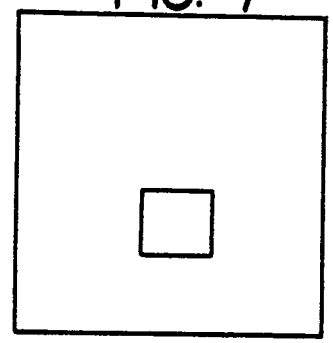
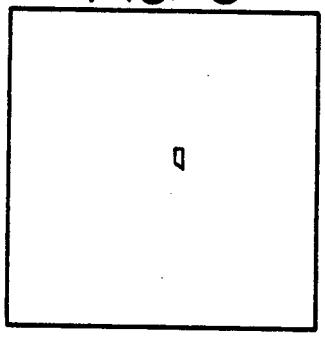
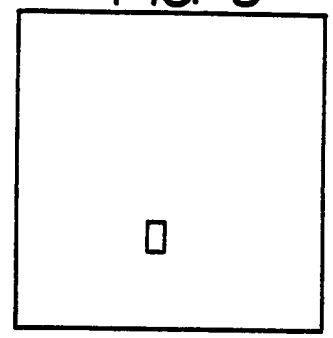
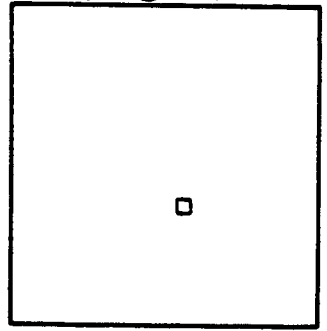
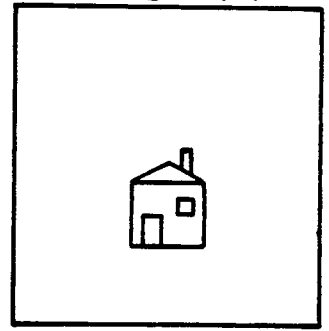
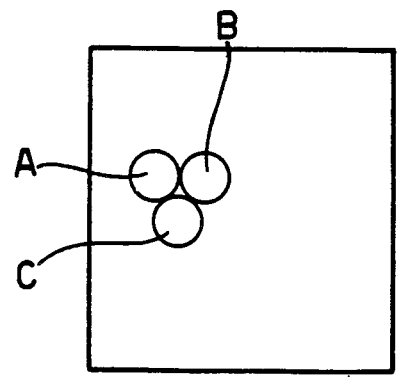

METHOD AND SYSTEM FOR THE INTEGRATED SUPPLY OF TELEMATIC SERVICES AND GRAPHIC INFORMATION TO USER TERMINALS, PARTICULARLY FOR ADVERTISING PURPOSES

DESCRIPTION

The present invention relates in general to the supply of telematic services and has been developed with particular attention to its possible use for the integrated supply of telematic services and graphic information to user terminals, particularly for advertising purposes.

At the present time, most telematic services which use the telephone network or similar networks for communication with user terminals enable the transmission to the user terminals of information messages which can substantially be reduced to strings of alphanumeric characters.

In order to enable or further to develop the transmission of such telematic services, it is considered essential to be able to integrate the alphanumeric information with graphic information, such as symbols identifying products and producers, graphic representations of the products themselves, geographical maps and plans, etc.

For example, in the case of patent data banks, it is very useful to be able to integrate the description of a particular patent document with a graphic representation of the solution which is the subject of the document. This requirement is felt particularly, for example, for documents with chemical subject-matter which contain graphic representations of the structures of certain compounds. This requirement becomes really imperative in the case of data banks which relate to ornamental designs or figurative trade marks.

In the case of remote sales services (teleshopping), it is very important to be able to provide the user with a visual display, even if diagrammatic, of the products being advertised and sold.

The same requirement is also felt in home banking services, for the purposes of offering to the user functions which correspond to the most common operations carried out over the bank counter, or in so-called teletourism services intended to solve problems such as the provision of information on destinations, transport carriers, hotel and non-hotel structures, restaurants, car-hire services, etc.

The possibility of the alphanumeric information being integrated with graphic information in Electronic Yellow Pages services is also particularly important. In this case, the object is to provide an Electronic Yellow Pages service which enables the supply of graphic advertising information in direct connection with the name of the advertiser sought and/or found, in relation to a particular market area, and also completely independently of the interrogation being carried out.

The prospect of the development of telematic services with integrated graphic information has up to now been limited by the fact that the transmission of graphic information on a telephone network or a similar network involves quite long transmission times which make the interrogation very slow. In fact, there is a risk that the user will have to wait quite a long time to obtain a graphic representation of the product itself, once he has received the alphanumeric information (for example, the description and the conditions of sale of a product in a teleshopping service).

The object of the present invention is to provide a method for the integrated supply of telematic services and graphic information to user terminals which resolves this problem and enables the integrated supply of telematic services and graphic information to be achieved on-line, with the possibility of simultaneously presenting the user with alphanumeric information and corresponding graphic information (or, in any event, graphic information—for example, of the advertising type—which is transmitted on-line to the user) on the screen of his terminal.

According to the present invention, this object is achieved by virtue of a method for the integrated supply of telematic services and graphic information to user terminals, characterised in that it comprises the steps of:
  providing at least one source of telematic services which can generate information messages,
  providing a network (that is, a receiving system which can be connected to telecommunication media) for linking the user terminals to the source of telematic services, the network enabling the transmission of information messages from the source of telematic services to the user terminals,
  providing each user terminal with a graphics function capable of generating particular non-elementary image components on a screen in dependence on respective command messages which can be transmitted on the network in the same way as the information messages,
  providing at least one source of graphic information in the form of a data bank of the respective command messages, and
  supplying the graphic information from the source to the user terminals through the network by the supply of command messages held in the data bank, the graphic information being supplied concomitantly with the supply of the information messages.

In other words, in the method according to the invention, the graphic information is not transmitted from the source to the user terminals in an elementary manner (with the sequential transmission of information relating to elementary fractions of images or pixels) but in the form of sequences of command messages which are structurally similar, in terms of format, protocols, transmission speed, etc., to the information messages which convey the alphanumeric information. These command messages enable the graphics function in each user terminal to reproduce a particular complete graphic message locally.

An advantageous development of the method according to the invention provides for the possibility of providing at least some of the user terminals with a function for the transmission of groups of command messages generated by the user to the data bank of graphic information. The users having this capability and connected to the network are thus offered the possibility of transmitting to the graphic-information data bank respective groups of commands which, once supplied through the network, will enable corresponding graphic messages to be reconstructed locally at the terminals of other users.

Another object of the invention is a system for the integrated supply of telematic services and graphic information to user terminals, which can carry out the method according to the invention.

According to a particularly advantageous development of this system, each of the user terminals is provided with a processing function which is able to modify and integrate its own graphics function in dependence on variation or update messages received from the source of services through the linking network, so as to enable the terminal itself to generate further graphic-message components locally in dependence on corresponding input commands.

The invention will be now be described, purely by way of non-limiting example, with reference to the appended drawings, in which:

FIG. 1 shows the network architecture of a system according to the invention, in the form of a block diagram, FIG. 2 shows a structural detail of the system of FIG. 1, FIG. 3 shows a further detail of the structure illustrated in FIG. 1, also in the form of a block diagram, FIG. 4 is a further block diagram which shows the internal structure of one of the elements indicated in FIG. 3, FIG. 5 shows the functional structure of one of the user terminals linked to the system of FIG. 1, also in the form of a block diagram, and FIGS. 6 to 12 show schematically the criteria by which the graphic information is presented on the screen of one of the terminals linked to the network of FIG. 1.

In FIG. 1, a system for the integrated supply of telematic services and graphic information from a transmission centre (host computer) 2 to a plurality of user terminals 3, usually constituted by personal computers (PCs), is generally indicated 1.

Communication between the host computer and the user terminals 3 is achieved through a network 4 provided with respective nodes 5.

The schematic representation of FIG. 1 relates essentially to the hierarchical structure of the system: it should not therefore be interpreted in the sense that all the telematic services and graphic information supplied through the system are necessarily stored in the host computer 2.

As will be made clearer below, the host computer 2 may in turn be linked to remote information sources, for example, a data bank, schematically indicated 6 in FIG. 1.

As far as the characteristics of the network 4 are concerned, however, the hierarchical organisation thereof provides (in this connection see the diagram of FIG. 2) for communication at a slow rate (typically 300-1200 bps) between each terminal 3 and the network node 5 to which it is connected, for example, with the use of a TTY-type transmission protocol.

The communication between the node 5 and the host computer 2 takes place (possibly through concentration nodes at higher hierarchical levels) at a high rate, for example, at a rate of the order of 9600 bits per second, with the use of high-speed synchronous protocols, such as the X25 protocol, and possibly with the use of a packet communication system.

The communication network 4 may in fact be constituted by a group of several networks which can effect communication between the host computer 2 and the terminals according to various criteria, in dependence on specific requirements of use and using existing communication structures.

For example, the diagram of FIG. 3 relates to a communication network 4 constituted by a first network 7, for example, the normal telephone network (possibly limited to the set of nodes and lines which lead to users subscribing to a particular group of telematic services) and by a specific data-transmission network, such as a network which operates according to a packet switching system (for example, the ITAPAC network operating on Italian territory).

In such a network configuration, the host computer is constituted by a main processing module 9 (or host computer proper), whose structure will be described further below with reference to FIG. 4, and by an auxiliary processing unit constituted by a mini computer 10 in a local network configuration (LAN) which can enable two-way communication between the main processing module 9 and physical networks 7, 8 of a different type.

The use of a local network 10 also enables other networks, such as the telephone network and/or international data networks 11 (with any necessary protocol conversions) and host computers 2' of other similar systems, to be linked to the system according to the invention.

The local network preferably has the configuration of an Ethernet-type LAN.

In the situation of use described, the local network 10 in practice operates in "reverse" compared to similar conventional networks.

The typical use of LANs of the Ethernet type is in fact related to a large number of users (some tens or hundreds) who access a few shared resources, which may be calculation, mass storage, printing, communication. There are substantially as many points as there are work stations connected, which can generate a few individual calls to a few shared positions (central processing unit, printer, etc.) by means of statistical-type laws.

In the example of use of the network 10 to which the diagram of FIG. 3 relates, however, there are a few access points (networks 7, 8, 11 and connections with another host computer or other host computers 2') which operate according to an X25 standard and generate many simultaneous calls (which correspond to the superposition of calls from users who require the supply of the services) to the host computer 9.

Preferably, an elapsed-time unit 12 is also associated with the local network 10 and has the function of ensuring the tariffing (accounting) of the services requested by the users.

In practice, the unit 12 receives information from the network, 10 relating to the user calling (user identification) and to the type of service requested from time to time (service identification) and then adopts different counting rates in dependence on the different costs of the services requested.

In the system according to the invention, the accounting of the various services is thus derived exclusively from a measurement of the duration of the connection of an individual user to the host computer 2, the charges being differentiated for the services which have different supply tariffs by the use of different counting rates.

The unit 12 can also provide (according to criteria which will be described further below) for the association of information services with graphic advertising information which is not correlated with the contents of the information service resident in the data banks of the host computer.

As shown in FIG. 4, the module 9 (or host computer proper) is constituted substantially by a pair of front-end processors (FEPs) which are interfaced with the local network 10 and, amongst other things, can achieve two-way conversion between an X25 protocol and an SDLC protocol.

According to a preferred embodiment, the two front-end processors 13 are constituted by two IBM 3725 processors.

The two front-end processors 13 are in turn linked to two main processors 14 and 15 constituted, for example, by an IBM 3083 processor (processor 14) and an IBM 3081 processor (processor 15).

The processors 14 and 15 are linked to the front-end processors 13 in a double-redundancy arrangement: each of the front-end processors 13 can in fact communicate with both the processors 14 and 15, whilst each of the latter can in turn communicate with both the front-end processors 13.

The processors 14 and 15 are connected to a group of information sources (sources of telematic services) which may be physically resident in mass storage units of the host computer 9 or may be located remotely like the data bank 6. In this connection, it should be remembered that the local network 10 also enables the connection of the host computer 2 to host computers 2' of other similar systems, in which information/services not available physically within the host computer 2 may be found.

Apart from their physical location, the information sources in question may be divided essentially into two categories, that is:
 sources of telematic services which can be reduced to the supply of alphanumeric character strings to the user, and
 sources of graphic information.

With reference to the diagram of FIG. 4, it is assumed that the remote data bank 6 and the other two sources or data banks 23, 24 resident in the host computer are sources of services of the first type, whilst the sources indicated 25, 26 and 27 are graphic information sources.

In the case of the source indicated 25, this is a source of graphic information, for example of the advertising type, intended to be supplied through the network independently of the other services supplied.

For example, this may be advertising information which is to be reproduced on the screens of the user terminals 3 during connection sessions without there being any connection with the other services supplied to the user at the time.

This graphic information is loaded into the data bank 25 (according to criteria which will be described further below) through an off-line processing function 28 controlled by the body administering the system 1. For the information source 26 (which is structurally identical to the information source 25), however, there is the possibility of the remote loading of graphic information by the users.

Some users with this capability and connected to the system 1 will therefore have in their terminals (according to criteria which will be further explained below) a function for the local generation of graphic information with the ability then to transmit this graphic information to the data base 26 for subsequent supply through the network.

The graphic information in question may be of an advertising nature in this case also. The users of the system (or at least some of them) are thus provided with a facility for introducing their advertising information into the system 1 for subsequent supply to other users.

The physical carrier (mass storage) of the database 26 containing the graphic information originated by the users is provided with a display function 29 as well as a charging function 30.

The object of the function 29 is to enable the body administering the system 1 to check that the graphic information loaded by users corresponds to certain basic requirements, both from the technical point of view and from the point of view of the content. The charging function 30 then enables the administering body to charge the user who has loaded his graphic information into the system the fees relating the service thus provided.

The graphics data bank 27 (which can be loaded both in the manner described with reference to the data base 25 and according to the method described with reference to the data base 26) has the characteristic that it contains graphic information which is associated in a context-dependent relationship with alphanumeric information contained in another data bank (in the example illustrated, the data bank 24).

By way of example, this may refer to a patent-type data bank containing information on patent documents which is to be provided, upon presentation to the user, with graphic representations of the technical solutions described in the documents identified.

In this case, the graphic information of the data bank 27 must be supplied to the users so that it is coordinated or in context with the corresponding alphanumeric information. Alternatively, this result can be achieved by merging the alphanumeric data base 24 with the graphics data base 27 once and for all, so as to generate a single integrated alphanumeric-graphic data base, or by providing the processors 14 and 15 with a searching (retrieval) function which, upon request by the users for a particular piece of information from the data bank 24, automatically searches the data base 27 for the corresponding graphic information and ensures its transmission to the user concomitantly with the alphanumeric information.

FIG. 5 shows schematically, in the form of a block diagram, the functional configuration of one of the user terminals 3 of the system according to the invention.

The terminal is preferably constituted by a personal computer (PC) provided with a screen 31 for the integrated display of alphanumeric and graphic information. The terminal 3 is also provided with all the other components and functions of a personal computer: these functions will not all be described since they are widely known to an expert in the field and also to the general public. Amongst these functions and components will be mentioned only one or more disc-drive units 32, a keyboard 33, and a screen-interaction unit or mouse 34.

Each terminal 3 is connected to the network 4 by means of a telecommunications control function TLC 36 with an execution or executor module connected in cascade.

The TLC unit 36 and the executor 37 achieve the physical connection of the control unit 38 of the personal computer and the network 4. The various functions 32, 33, 34, as well as (any) further external functions such as a timer 39 or a local telephone line 40, are connected to the control unit 38.

The control unit 38 controls (according to known criteria) all the functions of the personal computer.

Amongst the latter, and particularly important for the purposes of the present invention, are the graphics function 41 which controls the generation of graphic images on the screen 31, the function (telesoftware) 42 which receives instructions from the system, and the graphics-creation function 43.

As stated in the introduction to the present description, an essential characteristic of the system according to the invention is the possibility of the integrated transmission 1 of alphanumeric and graphic information through a single network (which—at the user terminals—is usually a low-speed network: 300–1200 bps).

For this purpose, in the system according to the invention, the graphic information is transmitted from the host computer 2 to the user terminal 3 not in the form of elementary graphic information (for example, black/white—or brightness and colour—information relating to each pixel of the screen 31) but in the form of instructions (command messages) which enable the graphics function 41 resident in each user terminal 3 to generate a particular non-elementary image component on the screen 31.

By way of (intentionally simplified) example, it is assumed that a graphic reproduction of a certain object, for example a building, is to be transmitted from the host computer 2 to the terminals 3.

Each user terminal 3 has resident sets of instructions (routines or macroinstructions) in its graphics function 41 for enabling respective graphic configurations, such as, for example, the roof, the main body, the chimney, a door or a window of a building, as schematically illustrated in the sequence of FIGS. 6 to 10, to be generated on the screen 31 by a given command message.

The command for generating each element of the image will generally contain the following information:
the nature of the object, with possible simultaneous identification of its colour and its graphic aspect,
the dimensions of the object (given, for example, in the form of the positions of its vertices), and
its location on the screen.

The sequential emission from the host computer 2 to the user terminal 3 in question of the sequence of commands corresponding to the reproduction of the graphic elements reproduced in FIGS. 6 to 10 will lead to the reproduction on the screen 11 of the whole image of a building which is intended to accompany an alphanumeric character string relating thereto.

In the case of a remote property sales (teleshopping) service, these indications could correspond to the location, the plan, the price, and other information relating to the property which is simultaneously displayed.

In principle, the same result could be obtained by the transmission of images which appear on the screen 31 in the form of sequences of elementary graphic information (pixel by pixel). However, even on a small screen, this method of transmission on a low-speed line, such as the user line, would require fairly long times which are incompatible with the speed of service required.

In the system according to the invention, however, this result is achieved by the transmission of the graphic information through the network 4 in the form of command messages which are substantially similar, in terms of format, protocol, speed of transmission, etc. . . . , to the information messages which convey the alphanumeric information. These command messages instruct the graphics function 41 of the user terminal so that it can generate the required image on its screen 31.

The input commands for the graphics function 41 are in fact constituted by strings of binary characters which convey the alphanumeric information for reproduction on the screen 31.

The function performed by the devices for loading the graphics data bases, for example, the off-line device indicated 28 in the diagram of FIG. 4, is therefore that of identifying, in the images which are to be supplied through the system 1 (thinking, for example, of an imaginary trade mark relating to a product which is to be advertised), the non-elementary image components which can be reproduced by the graphics function 41 of the user terminal in dependence on the respective command messages.

For example, these non-elementary image components may be constituted by polygons, geometric figures, also identified in terms of their colours of reproduction, dimensions, and positions relative to the screen 31.

The operation of loading the graphic information into the respective data bank will therefore correspond to the loading of a group of input commands which, when received by the graphics functions 41 of the user terminals 3, cause the reproduction of the required graphic message on the screens 31.

As a further example, reference is made to a graphic message constituted by a representation of an emblem constituted by three circles A, B, C arranged in a generally triangular configuration and having contrasting colours (FIG. 12).

The set of input commands loaded into the respective graphics data bank and intended for transmission to the user terminal will therefore be constituted thus:
Circle A—command 1: configuration type=circle; coordinates of the centre; diameter; colour.
Circle B—command 2: configuration type=circle; coordinates of the centre; diameter; colour.
Circle C—command 3: configuration type=circle; coordinates of the centre: diameter; colour.

It can immediately be seen that it is possible to transmit the information relating the representation of circles having $2^a$ different abscissae of the centre, $2^b$ different ordinates of the centre, $2^c$ different diameters, and $2^d$ different colours, with a message whose length is $k=a+b+c+d$ bits.

The screen of a personal computer currently is use is normally arranged for reproducing 80×24 characters each constituted by 3×5 points (pixels), that is, 240×120 pixels; it is therefore possible, by means of messages in which $a=8$, $b=7$, $c=8$, $d=6$, to represent on the entire screen the whole range of positions and dimensions possible for circles having $2^6=64$ different colours, with an image definition identical to that obtainable by the transmission of the information pixel by pixel (without the information relating to the colour) with messages comprising 240×120=28,800 bits.

On a low-speed network (of the order of 300–1200 bps) it can immediately be seen that the solution according to the invention achieves a reduction of at least one order of magnitude in the waiting time for the transmission of graphic information.

During the course of the useful life of the system, it may come to pass that graphic messages are introduced into the graphics data banks 25, 26, 27, etc. which, in order to be shown on the screens 31 of the user terminals, require the function 41 of each user terminal to generate image components which were not originally envisaged.

In these circumstances, the graphics function 41 of the user terminal may be supplemented, at the respective software level, with further data and instructions for enabling the decoding and implementation of new display command messages inserted into the system.

This result can be achieved by providing each user concerned with a new diskette for insertion into the unit 32 to update the graphics function 41.

Alternatively, the updating information may be transmitted directly from the host computer 2 to the user terminals 3 through the network 4.

For this purpose, the user terminals may be provided with a remote instruction function (or telesoftware) 42. The latter is able to receive updating messages from the host computer 2 and interpret them, carrying out the necessary modifications to the graphics function 41.

The same telesoftware function may also carry out the user help function with the presentation on the screen 31 of messages for the guidance of a user in difficulty.

The graphics creation function 43 operates in a manner complementary to the operations carried out by the graphics function 41.

In fact, the function 43 is able to analyse a graphic message created initially by the user at the local level with the use of the graphics 41, and then to generate a corresponding group of display command messages for transfer to the data base 26. These commands (once they have been overseen by the administering body by means of the functions 29 and 30 described above) can be supplied through the network 4, enabling the graphics functions 41 of the other user terminals to reproduce the user-generated graphic messages on their respective screens 31.

Naturally, the principle of the invention remaining the same, the forms of embodiment and details of construction may be varied widely with respect to those described and illustrated, without thereby departing from the scope of the present invention.

We claim:

1. A method for the integrated supply of telematic services and graphic information to user terminals, including the steps of:

providing at least one source of telematic services which generates information messages, providing a network for linking the user terminals to the source of telematic services, wherein said network enables the transmission of information messages from the source of telematic services to the user terminals;

providing each user terminal with a graphics function for generating non-elementary image components on a screen wherein said non-elementary image components are determined by command messages transmitted through the network int he same way as the information messages, providing at least one source of graphic information by storing command messages in a data bank, including within each command message, image component information including component configuration type, size, location, and color, supplying the graphic information to said user terminals by transmitting sets of command messages and concomitantly therewith transmitting information messages related to the graphic information, providing at least some of the user terminals with a function for user generation of command message sets, wherein said user generated command message sets produce a graphic message on the screens of user terminals and are completed by said function before transfer to the source of telematic services, and providing means for storing said user generated command message sets within said at least one graphic information source.

2. A method according to claim 1, including the steps of:

associating at least some of the information messages with respective sets of command messages, each set including command messages which can produce a respective graphic message on the screens of the user terminals, and supplying the information messages through network while concomitantly supplying the set of command messages associated therewith, wherein said information messages and command messages are transmitted within the same data stream.

3. A method according to claim 1, including the step of displaying the sets of user-generated command messages after their receipt by the storage means provided within the at least one graphic information source.

4. A method according to claim 1, including the step of measuring the duration of the periods for which each user terminal is connected to the network with at least two different counting rates for different telematic or graphic information services.

5. A system for the integrated supply of telematic and graphic information services to user terminals, comprising:

at least one source of telematic services which generates information messages, a network for connecting the user terminals to the source of telematic services, wherein said network enables the transmission of the information messages, graphic display means located at each user terminal for generating non-elementary image components on a screen, wherein said non-elementary image components are determined by command messages, transmitted through the network in the same way as the information messages;

at least one source of graphic information containing a data bank of the command messages, transmission means for the concomitant transmission of the information messages and command messages through the network to the user terminals, wherein each command message includes image component information describing component configuration type, size, location, and color.

user generation means within at least some of the user terminals for local user generation of command message sets, wherein said user generated command message sets produce a graphic message on the screens of user terminals and are completed by said user generation means before transfer to the source of telematic services, and means for storing said user generated command message sets within said at least one graphic information source.

6. A system according to claim 5, including:

a plurality of link networks for the user terminals, and
   a local network for interfacing the link networks with the transmission means.

7. A system according to claim 6, wherein the local network has an associated counting unit for measuring the durations of the periods of connection of each user terminal to the network, the counting unit being able to measure the durations of the periods with at least two different counting rates for telematic or graphic information services which are different from each other.

8. A system according to claim 5, including display means associated with the unit for storing the sets of display command messages generated locally by the user.

9. A system according to claim 5, including a charging module which is associated with the unit for storing the sets of display command messages generated locally by the user and can associate a corresponding fee to be charged with each set of command messages generated locally by the user and stored in the unit.

10. A system according to claim 5, including for at least some of the user terminals, receiver means for receiving updating messages generated by the source of telematic services.

* * * * *